(12) United States Patent
Matsumoto et al.

(10) Patent No.: US 6,668,119 B2
(45) Date of Patent: Dec. 23, 2003

(54) SUBSTRATE FOR MOUNTING OPTICAL PARTS, METHOD OF MANUFACTURING SAME, AND ASSEMBLY USING THE SUBSTRATE

(75) Inventors: Akira Matsumoto, Nagoya (JP); Masashi Fukuyama, Inuyama (JP); Akiyoshi Ide, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 101 days.

(21) Appl. No.: 10/080,286

(22) Filed: Feb. 21, 2002

(65) Prior Publication Data

US 2002/0118925 A1 Aug. 29, 2002

(30) Foreign Application Priority Data

Feb. 27, 2001 (JP) .......................................... 2001-052264
Jan. 23, 2002 (JP) .......................................... 2002-014076

(51) Int. Cl.[7] .............................. G02B 6/36; G02B 6/00
(52) U.S. Cl. ............................ 385/52; 385/97; 385/137
(58) Field of Search ........................ 385/49–52, 95–99, 385/137

(56) References Cited

U.S. PATENT DOCUMENTS 5,297,228 A * 3/1994 Yanagawa et al. .......... 385/129
6,240,235 B1 * 5/2001 Uno et al. .................. 385/137

FOREIGN PATENT DOCUMENTS

JP          02125209 A  *  5/1990  ............ G02B/6/30
JP          04340507 A  *  11/1992 ............ G02B/6/30

* cited by examiner

Primary Examiner—John D. Lee
Assistant Examiner—Daniel Valencia
(74) Attorney, Agent, or Firm—Burr & Brown

(57) ABSTRACT

There are provided a glass substrate for mounting optical parts capable of mounting a plurality of optical parts having different diameters by positioning the optical parts precisely, comprising:
  a groove for securing a first optical part having a relatively small diameter among a plurality of optical parts,
  V-shaped grooves formed on either side of the groove for securing a first optical part, and
  a groove for securing a second optical part formed so that outer tapered sections of the V-shaped grooves become outer grooves for securing an optical part having a relatively large diameter among a plurality of optical parts;
  a method for producing the same, and an assembly using the substrate.

12 Claims, 6 Drawing Sheets

FIG.4(a)  FIG.4(b)
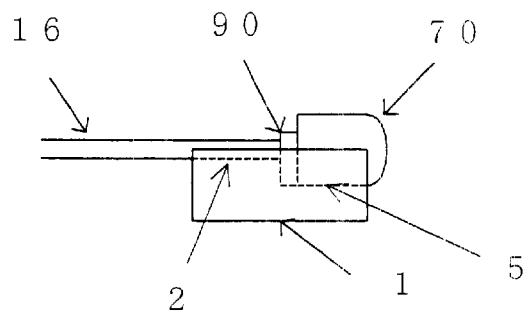
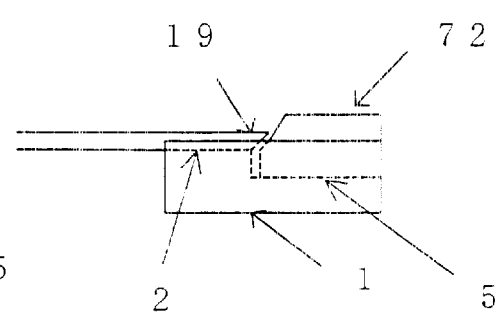
FIG.5
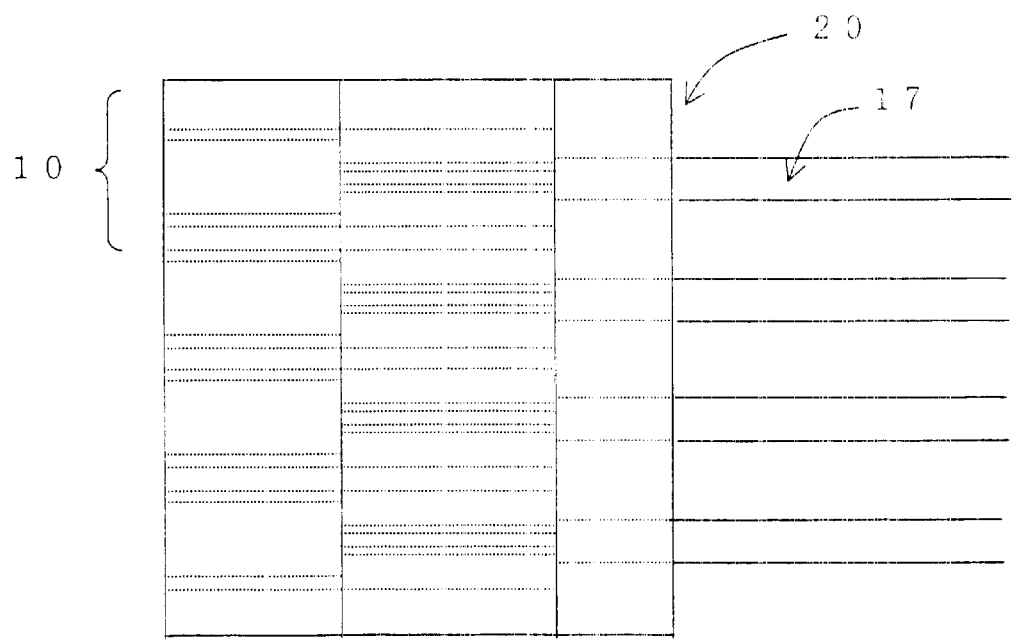

SUBSTRATE FOR MOUNTING OPTICAL PARTS, METHOD OF MANUFACTURING SAME, AND ASSEMBLY USING THE SUBSTRATE

This application claims the benefit of Japanese Application 2001-052,264, filed Feb. 27, 2001, and Japanese Application 2002-014,076, filed Jan. 23, 2002, the entireties of which are incorporated herein by reference.

BACKGROUND OF THE INVENTION

1. Field of the Invention

The present invention relates to a substrate for mounting optical parts, a method of manufacturing the same, and an assembly using the substrate.

2. Description of Related Art

A large number of steps are required when connecting optical parts, since a high degree of precision is needed.

As a means to solve this problem, there has been proposed a method of mounting optical parts on a substrate having guides for mounting optical parts (substrate for mounting optical parts) so as to position relatively the optical parts.

In a collimator array 50 shown in FIG. 10, which is an example of the substrate for mounting optical parts, a groove 52 for securing a fiber and a groove 54 for securing a lens are formed precisely at a relative position. However, in the case where the optical parts to be connected have different diameters, grooves having different sizes must be formed so that the center of a rod lens 15 corresponds to the center of a fiber 16. Therefore, such a substrate cannot be formed by a grinding process in which a passage for a grinding stone is necessary.

As a result, a substrate made of silicon, in which guide grooves for the lens and fiber are formed using anisotropic etching, has been mainly used as the substrate for mounting optical parts.

However, since the silicon substrate for mounting optical parts has a thermal expansion of $2.4 \times 10^{-6}$, the difference in thermal expansion between the substrate and the lens ($5-10 \times 10^{-6}$) used as the optical part is too great. This causes problems such as delamination of the lens due to thermal variation when bonding and securing the lens to the substrate for mounting optical parts.

Moreover, since the silicon substrate does not transmit ultraviolet rays (UV), use of a UV-curable adhesive is limited. Furthermore, the silicon substrate is very brittle, thereby resulting in poor handling capability and the like.

When the silicon substrate is connected to optical parts or mounted in a package, thermal expansion matching with members which the substrate contacts is needed. However, matching is determined in the case of using the silicon substrate and various measures must be taken when using this substrate.

Therefore, use of materials other than silicon such as glass (in particular) for manufacturing the substrates for mounting optical parts has been examined. However, these substrates cannot be subjected to a commonly-used grinding process to form second grooves shown by the reference number 52 in FIG. 10, and, therefore, are manufactured using discharge, ultrasonic machining, or the like. As a result, since the processing dimensional accuracy of these substrates is only about several tens of microns, these substrates cannot be put into practical use.

The present invention has been accomplished in view of the above problems in the conventional art. An object of the present invention is to provide a glass substrate for mounting optical parts excelling in dimensional accuracy, capable of preventing problems caused by the differences in thermal expansion with members, which the substrate contacts, such as optical parts and packages, and capable of improving workability at the time of mounting the optical parts, a method of manufacturing the same, and an assembly using the substrate.

SUMMARY OF THE INVENTION

One aspect of the present invention provides a glass substrate for mounting optical parts on which a plurality of optical parts having different diameters is mounted so that the optical parts are specifically positioned, comprising a groove for securing a first optical part having a relatively small diameter among a plurality of optical parts, V-shaped grooves formed on either side of the groove for securing a first optical part, and a groove for securing a second optical part formed so that outer tapered sections of the V-shaped grooves become outer grooves for securing an optical part having a relatively large diameter among a plurality of optical parts.

Another aspect of the present invention provides a method of manufacturing a glass substrate for mounting optical parts on which a plurality of optical parts having different diameters is mounted so that the optical parts are relatively positioned, comprising forming a groove for securing a first optical part, forming V-shaped grooves on either side of the groove for securing a first optical part, and grinding a groove for securing a second optical part while correcting the grinding conditions so that the center of the groove for securing a first optical part corresponds to the center of a virtual groove calculated so that outer tapered sections of the V-shaped grooves become outer grooves of the virtual groove.

The groove for securing a second optical part is preferably formed in a shape whereby only the outer tapered sections are in contact with the optical part having a relatively large diameter and the bottom thereof is not in contact with the optical part.

The groove for securing a second optical part is preferably formed by removing part of the groove for securing a first optical part.

Still another aspect of the present invention provides an assembly comprising the above substrate for mounting optical parts, and a plurality of optical parts mounted on the substrate.

Yet another aspect of the present invention provides a layered assembly in which a plurality of the above assemblies is layered.

Preferably, one of the optical parts mounted on the assembly is a lens, and a step section is formed on the side opposite to the groove for securing an optical part in which the lens is mounted.

BRIEF DESCRIPTION OF THE DRAWINGS

FIGS. 4(a) and (b) show another embodiment of a collimator manufactured by using the substrate for mounting optical parts of the present invention, wherein (a) is a side perspective view in the case of using an index matching fluid, and (b) is a side perspective view in the case of using an angle-cut fiber.

FIG. 5 is an upper view showing one embodiment (multi-core fiber collimator) of an assembly of the present invention.

DETAILED DESCRIPTION OF THE EMBODIMENT

The substrate for mounting optical parts of the present invention is a glass substrate on which a plurality of optical parts having different diameters is mounted so that the optical parts are relatively positioned, comprising a groove for securing a first optical part having a relatively small diameter among a plurality of optical parts, V-shaped grooves formed on either side of the groove for securing a first optical part, and a groove for securing a second optical part formed so that outer tapered sections of the V-shaped grooves become outer grooves for securing an optical part having a relatively large diameter among a plurality of optical parts.

Since the substrate for mounting optical parts of the present invention is made of glass, problems caused by the differences in thermal expansion with members, which the substrate contacts, such as optical parts and packages can be prevented in comparison with the case of using a conventional substrate made of silicon. Moreover, since the substrate transmits ultraviolet rays (UV), a UV adhesive can be used. Furthermore, since the substrate is more solid than the conventional silicon substrate, workability at the time of mounting the optical parts can be improved.

The present invention is described below in more detail with reference to the drawings.

Figure 1:
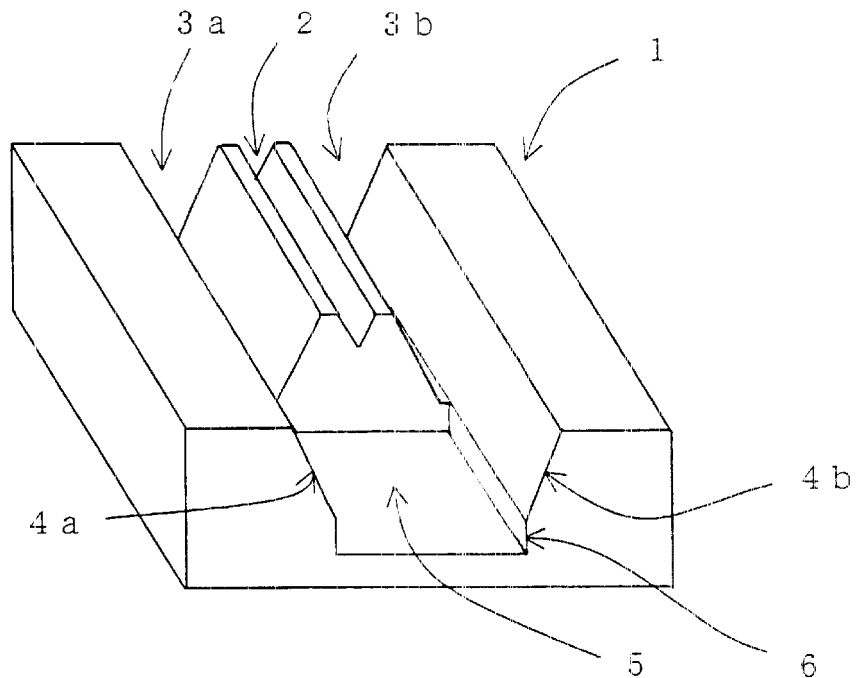
FIG. 1 is an oblique view showing one embodiment (collimator array) of a substrate for mounting optical parts of the present invention.

FIG. 1 is an oblique view showing one embodiment (collimator array) of the substrate for mounting optical parts of the present invention.

As shown in FIG. 1, a substrate 1 for mounting optical parts of the present invention has a groove 2 for securing a first optical part, in which an optical part having a relatively small diameter among a plurality of optical parts is mounted. V-shaped grooves (3a, 3b) are formed on either side of the groove 2 for securing a first optical part. A groove 5 for securing a second optical part is formed so that outer tapered sections (4a, 4b) of the V-shaped grooves (3a, 3b) become outer grooves for securing an optical part having a relatively large diameter among a plurality of optical parts.

The groove for securing a second optical part is preferably formed in a shape (concave groove 6) whereby the optical part having a relatively large diameter is in contact with only the outer grooves (4a, 4b), but not in contact with the bottom thereof. This enables the optical part having a relatively large diameter to be secured reliably at a specific position (see FIG. 3).

There are no specific limitations to the layout and pattern of the substrate 1 for mounting optical parts of the present invention. Various modifications and variations are possible corresponding to the optical parts to be mounted on the surface of the substrate.

A method of manufacturing the substrate for mounting optical parts of the present invention is described below with reference to FIG. 2.

Figure 2:
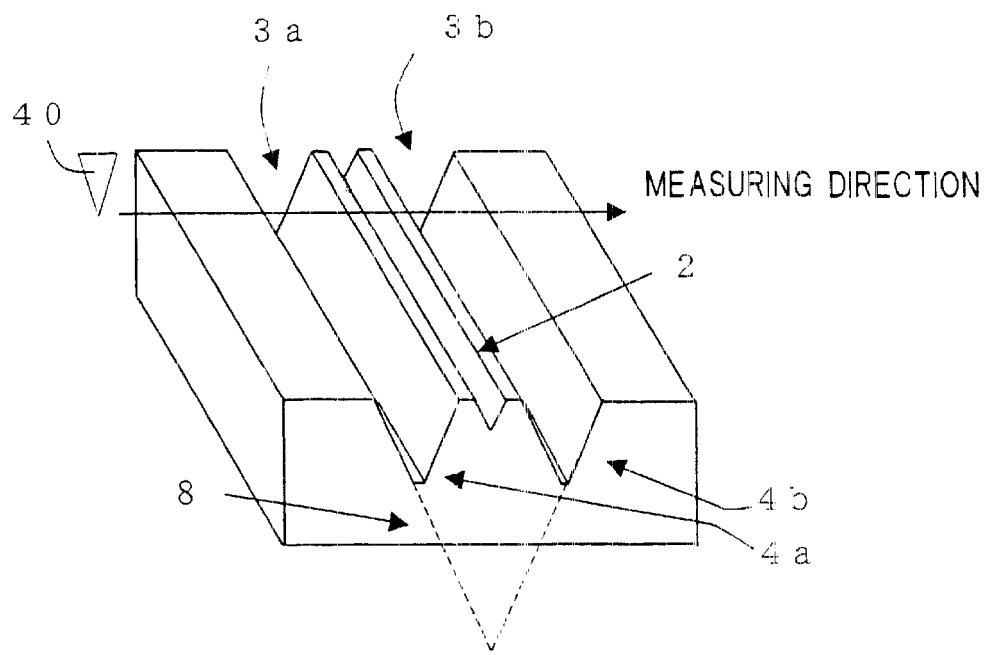
FIG. 2 is a view illustrating a method of manufacturing the substrate for mounting optical parts of the present invention.

As shown in FIG. 2, (1) the groove 2 for securing a first optical part is formed in a glass substrate, and the V-shaped grooves (3a, 3b) are formed on either side of the groove 2 for securing a first optical part, and (2) the groove 5 for securing a second optical part is ground while correcting the grinding conditions so that the center of the groove 2 for securing a first optical part corresponds to the center of a virtual groove 8 calculated so that the outer tapered sections (4a, 4b) of the V-shaped grooves (3a, 3b) become the outer grooves.

The groove 5 for securing a second optical part is preferably formed by removing part of the groove 2 for securing a first optical part, and is formed in a shape (concave groove 6) whereby only the outer grooves (4a, 4b) are in contact with the optical part having a relatively large diameter and the bottom thereof is not in contact with the optical part.

The concave groove 6, for which a higher degree of precision is not needed, may be formed using ultrasonic machining.

In the manufacturing method of the present invention, it is important to measure the dimensions of each groove after grinding just before reaching the target dimensions, and to perform finish grinding while taking into consideration the amount of grinding necessary to reach the desired dimensions calculated from the measurement results.

This enables the grinding allowance during final grinding to be minimized (about 10 $\mu$m, for example), whereby the grinding process can be performed with high precision due to small grinding force.

In the above (2), it is important to calculate the center of the virtual groove formed so that the outer tapered sections of the V-shaped grooves become the outer grooves using an operation program, and to perform the grinding process while correcting the grinding conditions so that the center of the virtual groove corresponds to the center of the groove for securing a first optical part.

The reasons therefor are as follows. In the case of forming grooves in a glass substrate, the grooves are formed by a grinding process using a grinding stone. As a result, the assumed angle of the grooves may not be reproduced precisely. Moreover, since the contact area and the grinding force are increased during the grinding process, the dimensions of the grooves may deviate from the assumed dimensions in view of precision of a grinder.

Even if the amount of grinding per unit time is decreased, it is difficult to precisely grind the grooves with a depth of several hundreds of microns in the order of sub-microns.

In the manufacturing method of the present invention, the dimensions of the grooves must be precisely measured in the order of sub-microns. Therefore, as shown in FIG. 2, it is preferable to measure 20 points or more on the surface of each groove by moving a stylus 40 of a contact-type shape measuring device vertically to the longitudinal direction of the grooves (2, 3), remove the edges and the bottom of each groove from the measured values over a length of 10 μm or more, and calculate the shape of the side of each groove as a shape formed by straight lines based on the measured data with an effective measurement length of 40 μm (see Japanese Patent Publication No. 6-79098).

There are no specific limitations to the contact-type shape measuring device used in the present invention. For example, a Form Talysurf (manufactured by Rank Taylor-Hobson Limited) may be suitably used.

As described above, according to the manufacturing method of the present invention, grooves for securing optical parts, in which a plurality of optical parts having different diameters is positioned relatively, can be ground precisely in the order of sub-microns. This has been difficult to achieve using a conventional grinding process.

Examples of an assembly of the present invention (assembly in which a plurality of optical parts is mounted on the substrate for mounting optical parts) are described below with reference to the drawings.

Figure 3A:
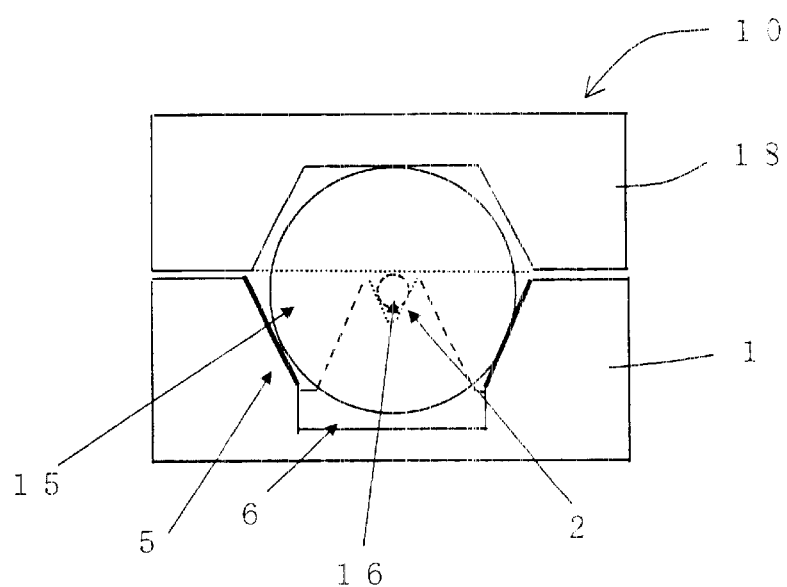
FIGS. 3(*a*) and (*b*) show one embodiment of a collimator manufactured by using the substrate for mounting optical parts shown in FIG. 1, wherein (a) is a front perspective view, and (b) is a perspective view from the upper side.
Figure 3B:
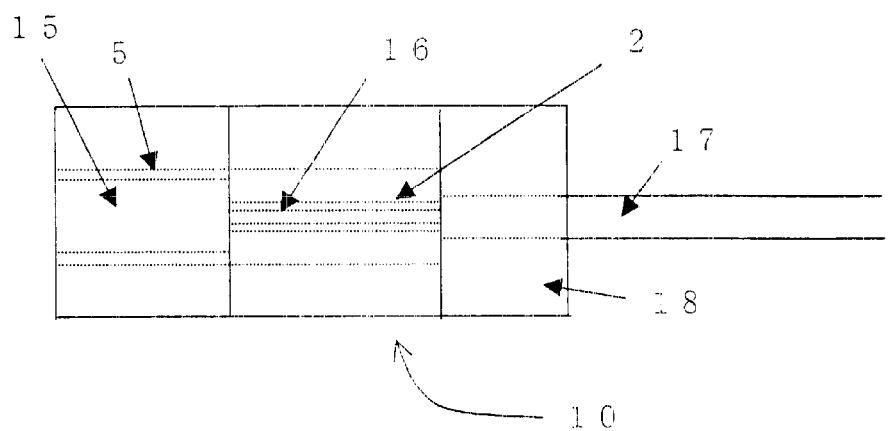

FIGS. 3(*a*) and (*b*) show one embodiment of a collimator manufactured using the substrate for mounting optical parts shown in FIG. 1 (lower substrate). In FIG. 3, (a) is a front perspective view, and (b) is a perspective view from the left.

A collimator 10 shown in FIG. 3 is manufactured by placing an optical fiber in the groove 2 for securing a first optical part (groove for securing optical fiber) as a lower substrate, pressing the optical fiber using an upper substrate (substrate for pressing an optical part) 18, securing the optical fiber using a UV adhesive, placing a rod lens 15 in a lens mounting section which is formed by the groove 5 for securing a second optical part (groove for securing a lens) and the upper substrate 18, and securing the rod lens 15 using a UV adhesive.

Since the deviations of the relative position of the groove 2 for securing a first optical part and the groove 5 for securing a second optical part can be limited to 1 μm or less, sufficient optical characteristics of the collimator 10 can be secured.

As the lens to be secured in the groove 5 for securing a second optical part, a gradient-index rod lens (GRIN lens), convex lens, flat convex lens, and ball lens can be given.

In the case where emitted light or incident light may be reflected by the first and second optical parts, in the case where the first optical part is an optical fiber, (1) use of angle-cut (8°-cut) fiber (see FIG. 4(*b*)), (2) formation of an antireflection film, (3) use of an index matching fluid 90 (see FIG. 4(*a*)), or the like may be appropriately employed.

In the case of combining an angle-cut fiber 19 with a GRIN lens 72 as the second optical part, as shown in FIG. 4(*b*), use of the GRIN lens 72 which is angle-polished on the fiber side is preferable.

As another embodiment of the assembly of the present invention, FIG. 5 shows a multi-core fiber collimator 20 (filter-type multiplexer/demultiplexer, for example) using the substrate for mounting optical parts including a multi-core collimator.

The multi-core fiber collimator, specifically, a collimator array may be manufactured as follows (see FIGS. 6 and 7).

Figure 6:
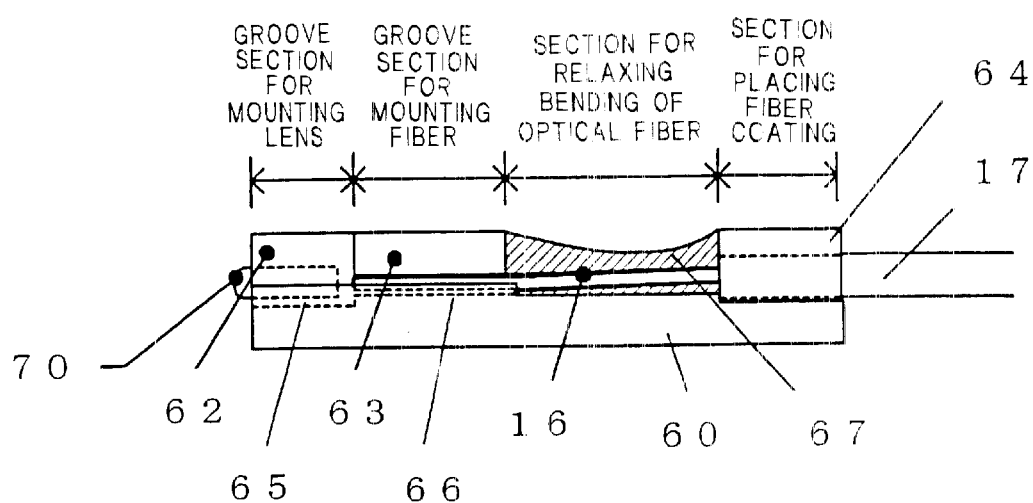
FIG. 6 is a side perspective view showing another embodiment (multi-core fiber collimator) of the assembly of the present invention.

As shown in FIG. 6, Pyrex glass was used as a material for a substrate 60 (substrate for mounting optical parts). The dimensions of the substrate 60 were a fiber pitch (lens pitch) of 1.25 mm, a thickness of 1.5 mm, a width of 16 mm, and a length of 14.5 mm. The number of cores was 12.

A groove section for mounting a lens (2.5 mm), a groove section for mounting a fiber (4 mm), a section for relaxing bending of the optical fiber (5 mm), and a section for placing fiber coating (3 mm) were formed in the direction of the length of the substrate 60.

Twelve fiber grooves 66 were formed in the substrate 60 at a pitch of 1.25 mm using a grinding process. Then, a lens groove 65 was formed.

A virtual center of the fiber groove 66 and a virtual center of the lens groove 65 were subjected to rough grinding. After measuring the relative position using a contact-type shape measuring device, the fiber groove 66 and the lens groove 65 were subjected to precise grinding (precision of the relative position of the virtual centers of the grooves became ±0.5 μm).

A flat convex lens 70 with a thickness of 2.5 mm at the center, a diameter of 1 mm, and a radius of curvature of 1.0 mmR was provided and secured in the lens groove 65.

The lens is preferably placed at a distance from the end section of the fiber groove 66, although this depends on the focal distance of the lens and the configuration of light to be transmitted through the space therebetween.

In FIG. 6, the flat convex lens 70 was secured at a distance of about 0.4 mm from the end section of the fiber groove 66 (see "t" in FIG. 7) in order to transmit parallel light taking into consideration the focal distance of the flat convex lens 70.

In the case where a higher degree of reliability is needed, the lens may be secured using a pressing substrate 62.

In FIG. 6, the flat convex lens 70 projects from the end face of the substrate 60. However, the flat convex lens 70 may be imbedded in the end face of the substrate 60.

This prevents occurrence of diffused reflection of light caused by an adhesive reaching the light emitting surface. Moreover, occurrence of scratches or the like on the end face of the lens can be prevented.

In the case where the flat convex lens 70 projects from the end face of the substrate 60 (see FIG. 6), a translucent protection film may be provided to prevent occurrence of scratches or the like.

In particular, in the case of using an epoxy-based adhesive having high viscosity, the adhesive rarely reaches the light emitting surface. Therefore, the flat convex lens 70 is preferably imbedded in the end face of the substrate 60 in order to prevent diffused reflection of light and occurrence of scratches or the like on the end face of the lens.

An optical fiber 16 of which the end face is cut in advance was provided and placed in the fiber groove 66.

The position of the optical axis direction of the optical fiber was adjusted while monitoring the angle of divergence of the emitted light so that the angle was minimized.

The parameters to be detected are not limited to the angle of divergence. For example, the position of the optical axis direction of the optical fiber may be adjusted while detecting the diameter of the beam.

Figure 7:
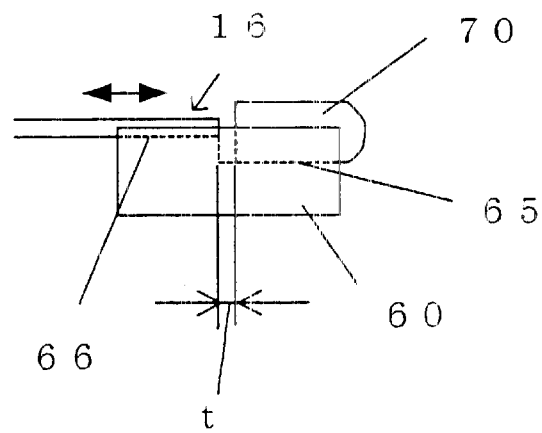
FIG. 7 is a view illustrating a method of adjusting the optical axis direction of an optical fiber during manufacturing of the assembly of the present invention.

In FIG. 7, the optical axis direction was adjusted on the fiber side. However, the optical axis direction may be adjusted on the lens side.

After adjusting the position in this manner, the optical fiber 16 was caused to be in contact with the fiber groove 66 using the pressing substrate 63 and was secured using the adhesive 67 to obtain a collimator array with extremely high positional precision, as shown in FIG. 6.

A two-dimensionally arranged collimator array (layered assembly) developed from the collimator array shown in FIG. 6 may be manufactured as follows.

Figure 8A:
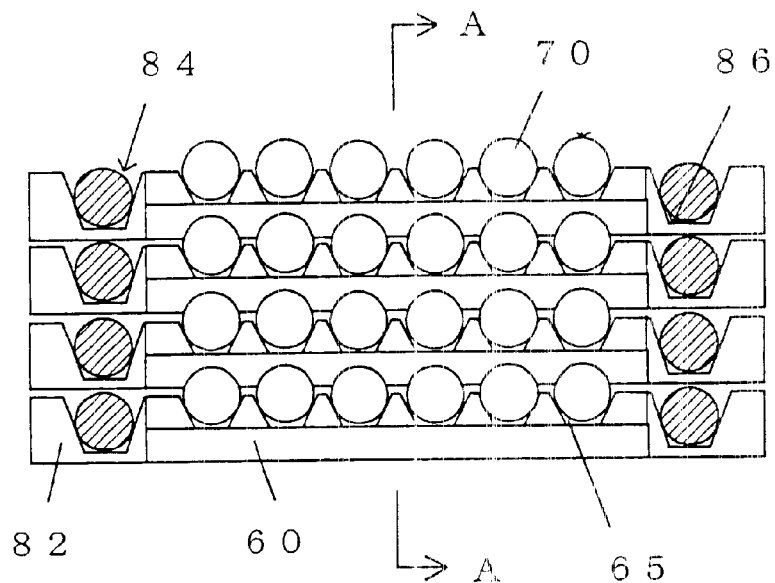
FIGS. 8(a) and (b) show still another embodiment (two-dimensionally arranged collimator array) of the assembly of the present invention, wherein (a) is a front view, and (b) is a cross-sectional view along the line A—A in (a).
Figure 8B:
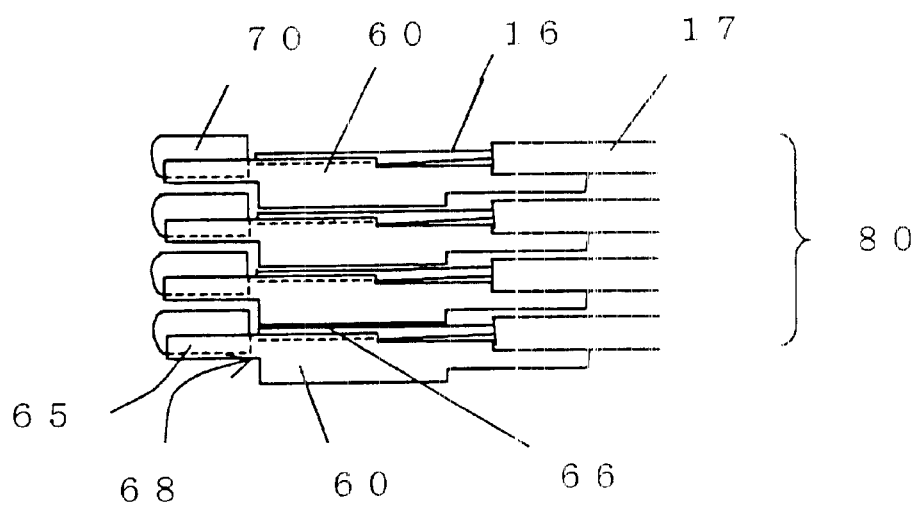

In a two-dimensionally arranged collimator array 80, four collimator arrays at a vertical pitch and a lateral pitch of 1.25 mm with a number of channels of six in the lateral direction were layered (see FIGS. 8(*a*) and (*b*)).

As shown in FIGS. 8(*a*) and (*b*), the substrates 60 were layered using a method of engaging guide grooves 86 (for securing contact with the guide pin 84) formed in the substrates 60 with guide pin jigs 82 on which the guide pin 84 was positioned with high accuracy.

A flat convex lens with a thickness of 2.5 mm at the center, a diameter of 1 mm, and a radius of curvature of 1.0 mmR was used.

Each of the substrates was provided with a step section 68 on the side opposite to the lens groove 65 (the side opposite to the groove for securing optical parts in which the lens was mounted) in order to prevent interference between the flat convex lens 70 and the substrate 60 during layering (see FIG. 8(*b*)).

The optical fibers 16 and the flat convex lenses 70 were mounted on the substrate thus prepared while adjusting the optical axis direction in the same manner as the collimator array shown in FIG. 6 to obtain four pieces of six-core collimator arrays (one dimension).

The one-dimensional collimator array 60 was positioned by causing the collimator array 60 to come in contact securely with the guide pins 84 of the guide pin jigs 82. Another one-dimensional collimator array 60 was mounted on the guide pin jig 82. The upper and lower collimator arrays 60 were then bonded together.

Positioning in the direction in which the substrates were layered was performed with high accuracy by repeating this operation to obtain the two-dimensionally arranged collimator array 80.

Figure 9:
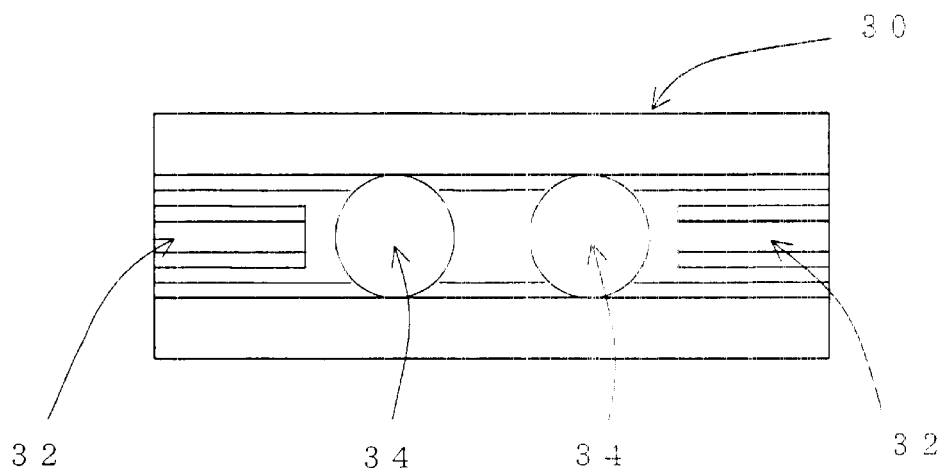
FIG. 9 is a upper view showing a substrate for mounting optical parts used in another embodiment (collimator for an isolator) of the assembly of the present invention.
Figure 10:
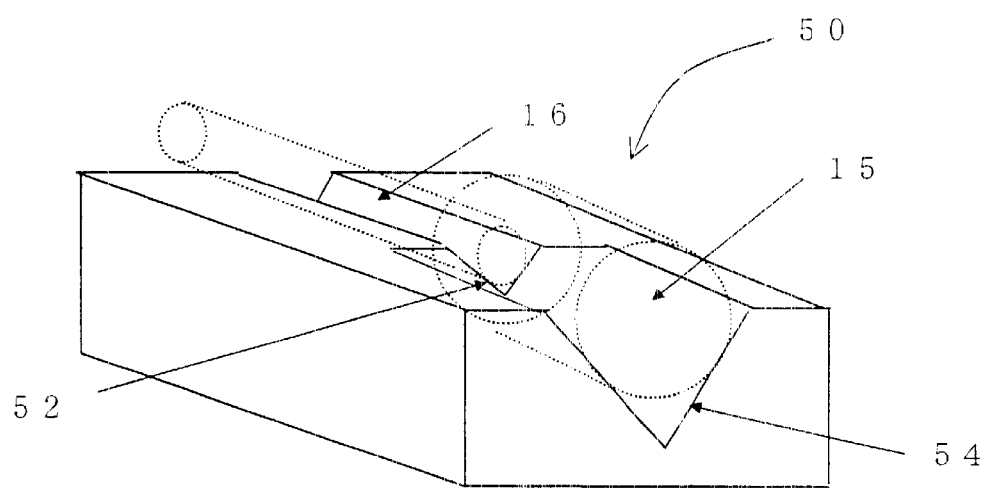
FIG. 10 is an oblique view showing an example of a conventional substrate for mounting optical parts (collimator array).

Still another embodiment of the assembly of the present invention is a collimator for an isolator using a substrate 30 for mounting an isolator shown in FIG. 9.

There are no specific limitations to the assembly of the present invention. Various types of optical modules may be manufactured corresponding to the optical parts to be mounted on the surface of the substrate.

As described above, according to the present invention, a glass substrate for mounting optical parts excelling in dimensional accuracy, capable of preventing problems due to the differences in thermal expansion with members, which the substrate contacts, such as optical parts and packages, and capable of improving workability at the time of mounting optical parts, a method of manufacturing the same, and an assembly using the same can be provided.

What is claimed is:

1. A glass substrate for mounting optical parts on which a plurality of optical parts having different diameters is mounted so that the optical parts are relatively positioned, comprising:
   a groove for securing a first optical part having a relatively small diameter among a plurality of optical parts,
   V-shaped grooves formed on either side of the groove for securing a first optical part, and
   a groove for securing a second optical part formed so that outer tapered sections of the V-shaped grooves become outer grooves for securing an optical part having a relatively large diameter among a plurality of optical parts.

2. The substrate for mounting optical parts according to claim 1,
   wherein the groove for securing a second optical part is formed in a shape whereby only the outer grooves are in contact with the optical part having a relatively large diameter and the bottom thereof is not in contact with the optical part.

3. The substrate for mounting optical parts according to claim 1,
   wherein the groove for securing a second optical part is formed by removing part of the groove for securing a first optical part.

4. A method of manufacturing a glass substrate for mounting optical parts on which a plurality of optical parts having different diameters is mounted so that the optical parts are specifically positioned, comprising:
   forming a groove for securing a first optical part,
   forming V-shaped grooves on either side of the groove for securing a first optical part, and
   grinding a groove for securing a second optical part while correcting the grinding conditions so that the center of the groove for securing a first optical part corresponds to the center of a virtual groove calculated so that outer tapered sections of the V-shaped grooves become outer grooves of the virtual groove.

5. The method of manufacturing a substrate for mounting optical parts according to claim 4,
   wherein the groove for securing a second optical part is formed in a shape whereby only the outer grooves are in contact with the optical part having a relatively large diameter and the bottom thereof is not in contact with the optical part.

6. The method of manufacturing a substrate for mounting optical parts according to claim 4,
   wherein the groove for securing a second optical part is formed by removing part of the groove for securing a first optical part.

7. The method of manufacturing a substrate for mounting optical parts according to claim 5,
   wherein the groove for securing a second optical part is formed by removing part of the groove for securing a first optical part.

8. An assembly comprising:
   a glass substrate for mounting optical parts on which a plurality of optical parts having different diameters is mounted so that the optical parts are relatively positioned, comprising:
   a groove for securing a first optical part having a relatively small diameter among a plurality of optical parts, V-shaped grooves formed on either side of the groove for securing a first optical part, and
   a groove for securing a second optical part formed so that outer tapered sections of the V-shaped grooves become outer grooves for securing an optical part having a relatively large diameter among a plurality of optical parts, and a plurality of optical parts mounted on the substrate.

9. The assembly according to claim 8,
   wherein the substrate has a plurality of grooves for securing a second optical part being formed in a shape, whereby only the outer grooves are in contact with the optical part having a relatively large diameter and the bottom thereof is not in contact with the optical part.

10. The assembly according to claim 8,
   wherein the substrate has a plurality of grooves for securing a second optical part being formed by removing part of the grooves for securing a first optical part.

11. The assembly in which a plurality of the assemblies recited in claim 8 is layered.

12. The assembly according to claim 11,
wherein the assembly is layered, one of the optical parts mounted on the assembly is a lens, and
a step section is formed on the side opposite to the grooves for securing an optical part in which the lens is mounted.

* * * * *